US012774075B1

(12) United States Patent
Khoury et al.

(10) Patent No.: US 12,774,075 B1
(45) Date of Patent: Oct. 27, 2026

(54) SYSTEMS AND METHODS FOR CONTROLLING PERFORMANCE OF MARINE ENGINES WITH ALCOHOL FUELS

(71) Applicant: Brunswick Corporation, Mettawa, IL (US)

(72) Inventors: Jalal K. Khoury, Fond du Lac, WI (US); Brian J. Fregonese, Fond du Lac, WI (US); Eric S. Mueller, Fond du Lac, WI (US); Timothy S. Reid, Eden, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 19/230,431

(22) Filed: Jun. 6, 2025

(51) Int. Cl.

| | |
|---|---|
| ***B63H 21/21*** | (2006.01) |
| ***F02D 13/02*** | (2006.01) |
| ***F02D 29/02*** | (2006.01) |
| ***F02D 31/00*** | (2006.01) |
| *B63H 21/14* | (2006.01) |

(52) U.S. Cl.
CPC ............ *B63H 21/21* (2013.01); *F02D 13/02* (2013.01); *F02D 29/02* (2013.01); *F02D 31/00* (2013.01); *B63H 21/14* (2013.01); *B63H 2021/216* (2013.01)

(58) Field of Classification Search
CPC .. B63H 21/21; B63H 21/14; B63H 2021/216; F02D 13/02; F02D 29/02; F02D 31/00
USPC ........................................................ 701/21
See application file for complete search history.

(56) References Cited

U.S. PATENT DOCUMENTS

| | | | | |
|---|---|---|---|---|
| 5,950,588 | A | 9/1999 | Kusche | |
| 6,109,986 | A | 8/2000 | Gaynor | |
| 6,295,963 | B1 | 10/2001 | Kollock | |
| 6,571,753 | B1 | 6/2003 | Jaeger | |
| 6,757,606 | B1 | 6/2004 | Gonring | |
| 7,299,783 | B1 | 11/2007 | Broman | |
| 7,354,324 | B1 | 4/2008 | Jaszewski | |
| 7,806,741 | B1 | 10/2010 | Baier | |
| 8,725,390 | B1 * | 5/2014 | Snyder | F02D 41/345 123/480 |
| 9,482,175 | B1 | 11/2016 | Torgerud | |
| 9,695,764 | B1 * | 7/2017 | Christiansen | F02D 11/02 |

(Continued)

FOREIGN PATENT DOCUMENTS

| | | |
|---|---|---|
| CN | 101549681 A * | 10/2009 |

*Primary Examiner* — Muhammad Shafi
(74) *Attorney, Agent, or Firm* — Andrus Intellectual Property Law, LLP

(57) ABSTRACT

A marine propulsion system for a marine vessel is provided. The system includes at least one marine drive having an internal combustion engine configured to combust fuel, a sensor used to determine the alcohol content of the fuel supplied to the internal combustion engine, and a memory storing a reference calibration for engine output. The system further includes one or more controllers configured to receive the alcohol content, determine a modification to at least one engine parameter based on the alcohol content of the fuel so that the engine performs according to at least a portion of the reference calibration. The engine parameter comprises a throttle position, a spark timing, an air-fuel ratio, a boost pressure, an exhaust gas recirculation or a camshaft timing. The one or more controllers are further configured to operate the at least one marine drive according to the modified engine parameter.

18 Claims, 5 Drawing Sheets

(56) References Cited

U.S. PATENT DOCUMENTS

| | | | | |
|---|---|---|---|---|
| 10,094,321 | B1 | 10/2018 | Anschuetz | |
| 2015/0204264 | A1* | 7/2015 | Gibson | F02D 41/30<br>123/491 |
| 2016/0245193 | A1* | 8/2016 | Makled | F02D 41/0025 |
| 2018/0051646 | A1* | 2/2018 | Ranga | F02D 41/402 |

* cited by examiner

SYSTEMS AND METHODS FOR CONTROLLING PERFORMANCE OF MARINE ENGINES WITH ALCOHOL FUELS

FIELD

The present disclosure relates generally to marine propulsion systems and more specifically to systems and methods for controlling performance of marine engines with fuels of varying alcohol content.

BACKGROUND

The following U.S. Patents are incorporated herein by reference, in entirety:

U.S. Pat. No. 6,757,606 discloses a method for controlling the operation of an internal combustion engine that includes the storing of two or more sets of operational relationships which are determined and preselected by calibrating the engine to achieve predetermined characteristics under predetermined operating conditions. The plurality of sets of operational relationships are then stored in a memory device of a microprocessor and later selected in response to a manually entered parameter. The chosen set of operational relationships is selected as a function of the selectable parameter entered by the operator of the marine vessel and the operation of the internal combustion engine is controlled according to that chosen set of operational parameters. This allows two identical internal combustion engines to be operated in different manners to suit the needs of particular applications of the two internal combustion engines.

U.S. Pat. No. 8,725,390 discloses systems and methods for optimizing fuel injection in an internal combustion engine that adjust start of fuel injection by calculating whether one of advancing or retarding start of fuel injection will provide a shortest path from a source angle to a destination angle. Based on the source angle and a given injection pulse width and angle increment, it is determined whether fuel injection will overlap with a specified engine event if start of fuel injection is moved in a direction of the shortest path. A control circuit increments start fuel injection in the direction of the shortest path if it is determined that fuel injection will not overlap with the specified engine event, or increments start fuel injection in a direction opposite that of the shortest path if it is determined that fuel injection will overlap with the specified engine event.

U.S. Pat. No. 9,482,175 discloses a system for providing fuel to an internal combustion engine that comprises a fuel reservoir for containing fuel for use by the internal combustion engine; a first pump that pumps fuel from a supply tank into the fuel reservoir; and a battery that provides electrical power to the first pump. A control circuit sends signals to selectively run the first pump so as both to minimize the total amount of electrical power consumed by the system and to maintain at least a minimum amount of fuel in the reservoir. Methods for filling a fuel reservoir that contains fuel for use by an internal combustion engine are also provided.

U.S. Pat. No. 9,695,764 discloses a marine drive system that includes an engine, a fuel system that provides at least two different fuels to the engine, and a fuel selection means for selecting a fuel type. A control unit accesses a set of fuel-specific operating parameters based on the selected fuel type and controls the engine based on the set of fuel-specific operating parameters.

U.S. Pat. No. 10,094,321 discloses controlling a marine engine that includes operating the engine according to an initial set of mapped parameter values to achieve a first target fuel-air equivalence ratio, determining a first actual fuel-air equivalence ratio, and using a feedback controller to minimize a difference between the first target and actual ratios. Feedback controller outputs are used to populate an initial set of adapt values to adjust combustion parameter values from the initial set of mapped parameter values. The method includes transitioning to operating the engine according to a subsequent set of mapped parameter values to achieve a different target fuel-air equivalence ratio. The method includes determining a second actual fuel-air equivalence ratio, using the feedback controller to minimize a difference between the second target and actual ratios, and using feedback controller outputs to populate a subsequent set of adapt values to adjust combustion parameter values from the subsequent set of mapped parameter values.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to an exemplary implementation of the present disclosure, a marine propulsion system for a marine vessel is provided. The system includes at least one marine drive having an internal combustion engine configured to combust fuel, a sensor used to determine the alcohol content of the fuel supplied to the internal combustion engine, and a memory storing a reference calibration for engine output. The system further includes one or more controllers configured to receive the alcohol content, determine a modification to at least one engine parameter based on the alcohol content of the fuel so that the engine performs according to at least a portion of the reference calibration. The engine parameter comprises at least one of a throttle position, a spark timing, an air-fuel ratio, a boost pressure, an exhaust gas recirculation and a camshaft timing. The one or more controllers are further configured to operate the at least one marine drive according to the modified engine parameter.

According to another exemplary implementation of the present disclosure, a method for operating a marine propulsion system having at least one marine drive with an internal combustion engine configured to combust fuel is provided. The method includes receiving an alcohol content from a sensor configured to determine an alcohol content of the fuel supplied to the internal combustion engine, and determining a modification to at least one engine parameter based on the alcohol content of the fuel so that the engine performs according to a reference calibration for engine output. The engine parameter comprises at least one of a throttle position, a spark timing, an air-fuel ratio, a boost pressure, an exhaust gas recirculation and a camshaft timing. The method further includes operating the at least one marine drive according to the modified engine parameter.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

As the marine industry turns toward the use of more sustainable fuels for internal combustion engines of marine drives, a potential solution is high blend alcohol fuels. Such fuels may contain, for example, a 50:50 or 75:25 ratio of ethanol to gasoline, as opposed to a traditional low blend alcohol fuel, which may contain a ratio of 10:90 ratio of ethanol to gasoline. High blend alcohol fuels can achieve higher performance than lower blend or pure gasoline fuels because high blend alcohol fuels can inject more energy at a constant value of Lambda ($\lambda$). $\lambda$ is a universal constant representative of a measured air-fuel ratio (AFR) divided by a stoichiometric AFR for a given fuel. The stoichiometric AFR is the AFR where complete combustion of fuel occurs. For example, for pure gasoline, the stoichiometric AFR is 14.7:1. For E10 fuel (10% ethanol, 90% gasoline), the stoichiometric AFR is 14.1:1, and for E85 fuel (85% ethanol, 15% gasoline), the stoichiometric AFR is 9.7:1. The "E" designation for ethanol fuels refers to the percentage of ethanol comprising the fuel, with the remainder comprising gasoline. Ethanol further has higher heat of vaporization as compared with gasoline, meaning that ethanol evaporates absorbs more heat from surrounding engine components, including the cylinder walls and air charge, as it vaporizes. By lowering the engine temperature, engine knock is reduced and more efficient combustion can occur.

Figure 5:
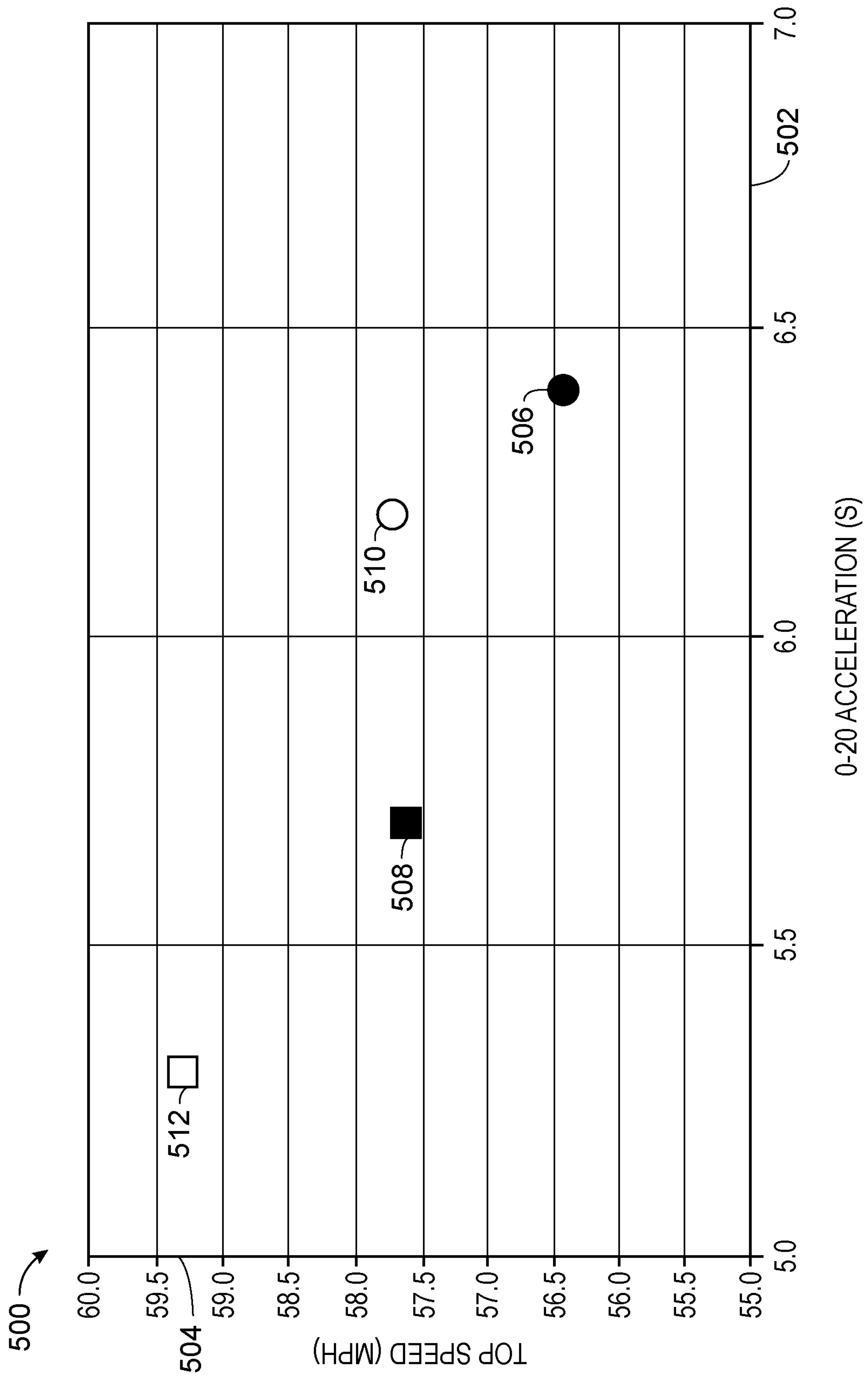
FIG. 5 is a plot comparing the marine vessel accelerations and top speeds achievable using high and low blend alcohol fuels.

The performance gains achievable by high blend alcohol fuels are depicted in FIG. 5 of the present application. Plot 500 depicts comparable acceleration and top speed data for high and low blend alcohol fuels. Horizontal axis 502 depicts the amount of time required for a marine vessel employing the selected fuel to accelerate from 0 to 20 miles per hour (mph) in seconds(s), while vertical axis 504 depicts the top speed achievable in mph for a marine vessel employing the selected fuel. As shown by datapoints 506 and 508 respectively, a test vessel that requires approximately 6.4 seconds to accelerate from 0-20 mph and can achieve a top speed of just under 56.5 mph burning E10 fuel requires only approximately 5.7 seconds to accelerate from 0-20 mph and can achieve a top speed of just over 57.5 mph burning E85 fuel.

However, the present inventors have recognized that the performance gains achievable by high blend alcohol fuels can result in a mismatch between the performance achievable by the fuel and the propeller selected for the marine drive. Propeller pitch refers to the distance a propeller would move in one full rotation. For example, a propeller with a 20 inch pitch would move a marine vessel forward 20 inches with each complete revolution of the propeller, while a propeller with a 15 inch pitch would move a marine vessel forward 15 inches with each complete revolution of the propeller. Lower pitch propellers provide better acceleration and more power at lower speeds because they permit an engine to reach higher RPMs more quickly, while higher pitch propellers can reach overall higher top speeds at a given engine RPM than lower pitch propellers, but cannot accelerate as quickly. If a propeller pitch is too high, the marine drive may struggle to achieve its optimal RPM, resulting in poor acceleration performance and engine strain. Conversely, if a propeller pitch is too low for a given engine output, the marine drive can enter an over-rev condition in which the engine is spun at an excessively high speed, fuel efficiency is reduced, top speed performance will suffer, and the risk of engine damage is increased.

The present inventors have therefore recognized that a propeller pitch that is suitable for the performance achievable using low blend alcohol fuels may be too low when the marine drive is instead fueled by a higher blend alcohol fuel that offers a greater injection of energy than the low blend fuel. As a range of higher blend alcohol fuels (e.g., E50, E75, E85) may be available to consumers at various fueling locations, and it is unreasonable to expect a consumer to change out propellers in order to achieve the ideal pitch for the high blend alcohol fuel, the present inventors have devised systems and methods that determine the alcohol content of a fuel and automatically adapt various engine parameters accordingly. In some of the methods described herein, the propulsion system may be controlled such that a higher blend alcohol fuel is detected to be in use, and engine parameters are modified so that the engine generates power and torque outputs that conform with a stored reference calibration for a lower blend alcohol fuel, thereby ensuring that engine performance using the higher blend fuel is identical to the performance achievable with a lower blend fuel. In other embodiments, the propulsion system may be controlled such that a lower blend alcohol than the stored calibration is detected to be in use, and engine parameters are modified so that the engine generates power and torque outputs that conform with a stored reference calibration for a higher blend alcohol fuel. The stored reference calibration may refer to expected power and/or torque outputs for the engine at various engine speeds when using a particular fuel obtained through test data and/or calculation. In other methods described herein, the propulsion system may be controlled such that the performance advantages of the higher blend alcohol fuel are utilized to generate improved engine outputs at lower speeds but capped at higher speeds so that the performance of the engine matches the performance of the lower blend alcohol fuel once the speed of the engine or the propeller exceeds a speed threshold. By conforming the performance of the propulsion system to at least a portion of a reference calibration for a low blend alcohol fuel, the drawbacks of propeller pitch mismatch are avoided and the performance advantages of the high blend alcohol fuel can be maximized. The systems and methods of the present disclosure further offer reliability and predictability to an operator, ensuring that the propulsion system performs comparably no matter the alcohol content of the fuel utilized.

Figure 1:
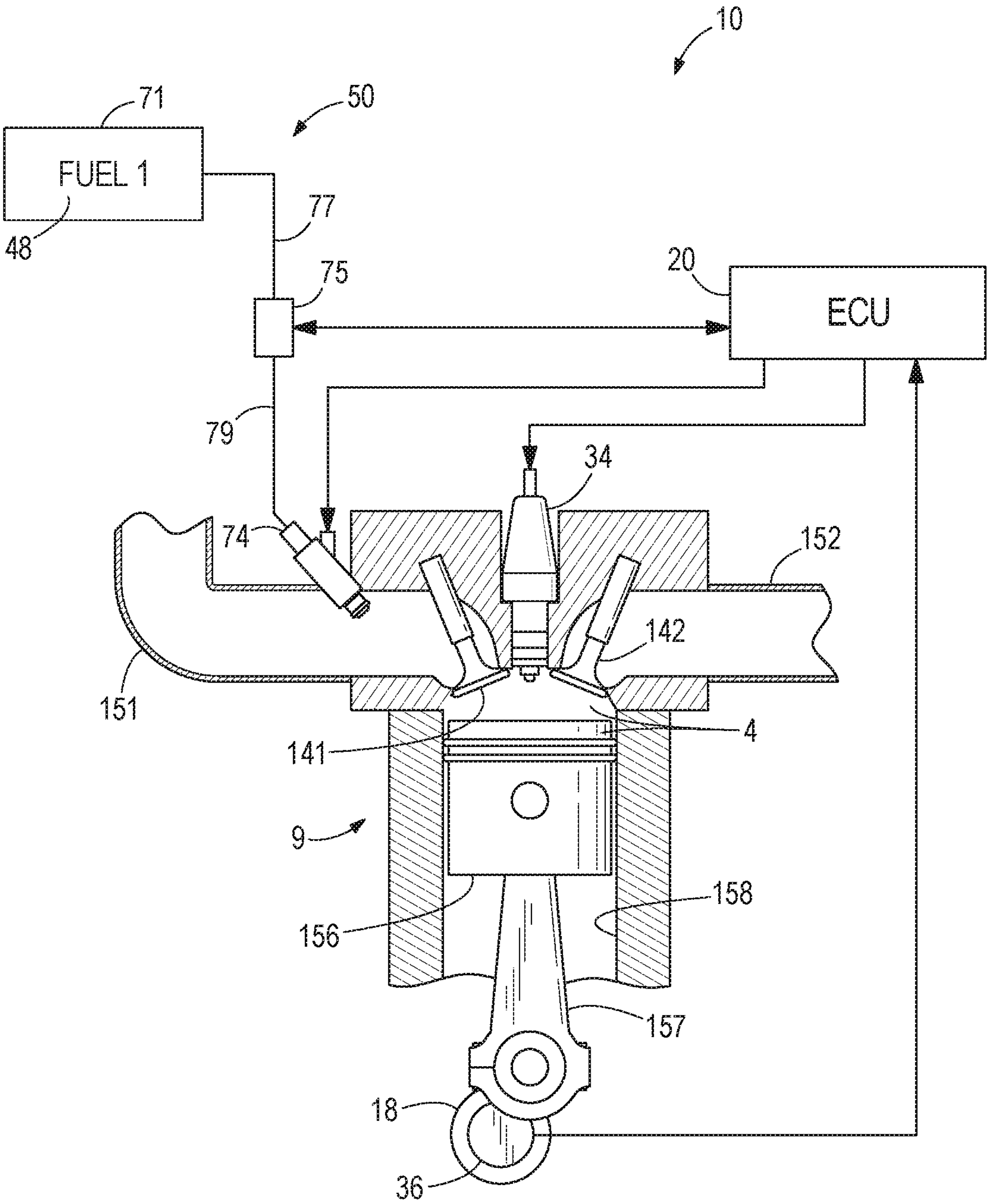
FIG. 1 depicts a cross section of a marine propulsion system having a fuel system controlled by an engine control unit according to an exemplary implementation of the present disclosure.

FIG. 1 depicts a cross section of an internal combustion engine for a marine drive of a marine vessel having a fuel delivery assembly and an ignition system controlled by an engine control unit ("ECU") 20. In various embodiments, the marine drive could be a variety of types of drives (e.g., an outboard drive, a stern drive), and the vessel may include one or more marine drives. The cross section of engine 9 has an intake manifold 151 and an exhaust manifold 152, which are in communication with a piston-cylinder 4 via an intake valve 141 and an exhaust valve 142. In an exemplary embodiment, the engine 9 comprises four piston-cylinders 1-4. The exemplary piston-cylinder 4 has a piston 156 and a cylinder 158. Within the cylinder 158 is a piston 156 connected via a connecting rod 157 to a crankshaft 18. The cross section also comprises fuel injector 74 and a spark plug 34. In this example, the engine 9 is a non-direct injection engine and the fuel injector 74 injects fuel into the intake manifold 151. A sensor 36 is provided in this example for sensing a rotational speed and/or angular position of the crankshaft 18. The sensor 36 is provided in the vicinity of the crankshaft 18 and connecting rod 157 and senses the speed of the engine 9. The sensor 36 need not be located where shown but could be located elsewhere. Further, although not shown in this example, other engine running condition sensors could be provided, such as for example cylinder pressure sensors, manifold pressure sensors, temperature sensors, and throttle sensors. The exemplary system 10 comprises a fuel delivery assembly that is a non-direct injection system. As will be known by one of skill in the art, other fuel delivery assemblies may be employed to execute the systems and methods disclosed herein. For example, appropriate fuel delivery systems may include any direct injection and multiport fuel injection (non-direct inject) systems.

Figure 2:
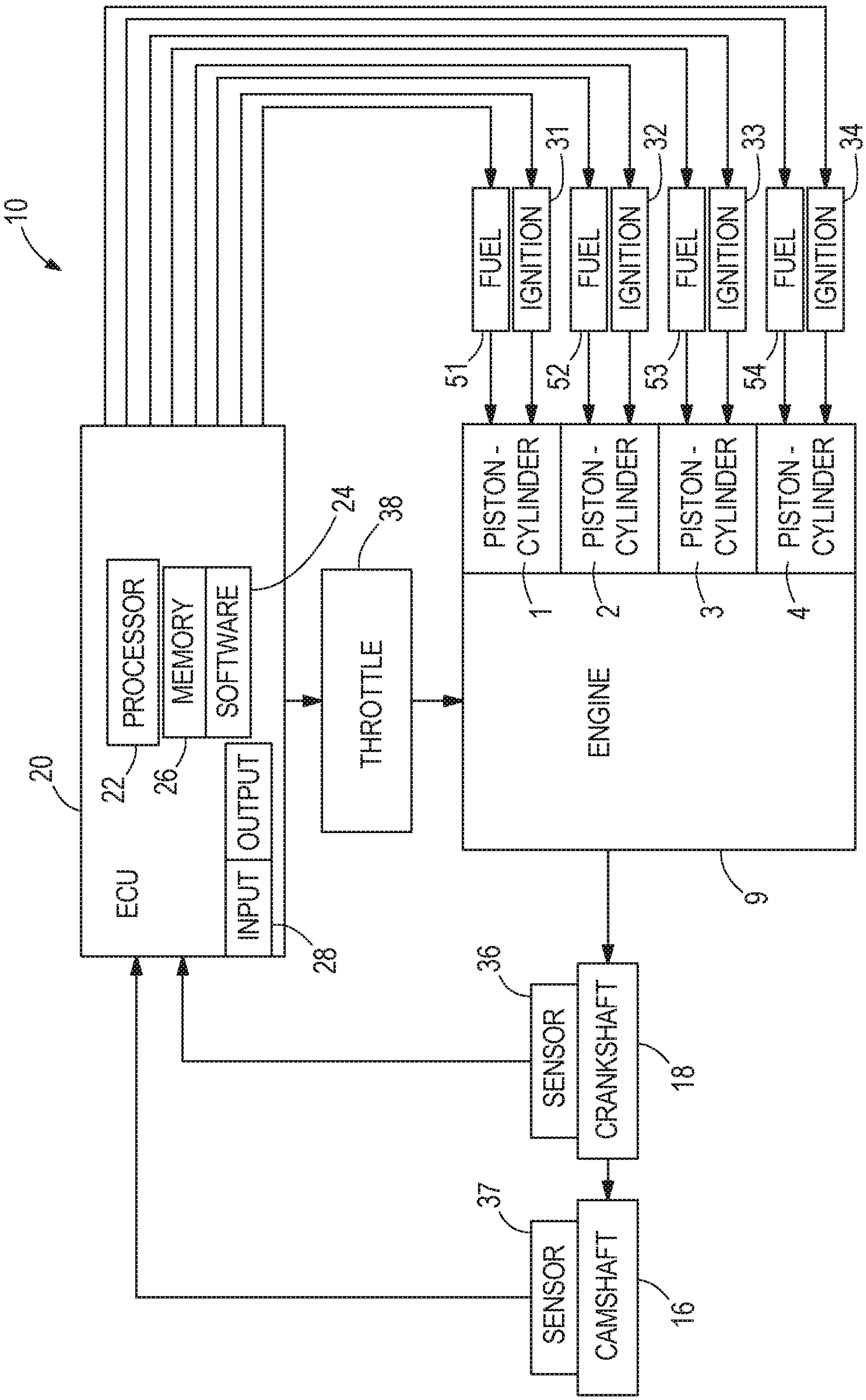
FIG. 2 is a schematic diagram of a marine propulsion system according to the present disclosure.

FIG. 2 is a schematic showing a non-limiting example of a system 10 for controlling operations of an internal combustion engine 9. In the example of FIGS. 1 and 2, the engine 9 is a four-stroke engine having four piston-cylinders 1-4 that are arranged in an inline formation. However the type of stroke and number of piston-cylinders can vary from that which is shown. For example, the methods and systems disclosed herein may be utilized in engines having any number of cylinders, including two, six, twelve, etc., as will become clear to one of ordinary skill in the relevant art. The arrangement of the piston-cylinders also can vary and in some examples can be arranged in a V-configuration or opposed-configuration instead of an inline configuration. As is conventional, reciprocation of the pistons in the cylinders causes rotation of a crankshaft 18, which in turn causes rotation of a camshaft 16. In situations where the engine 9 is configured for use in marine applications, rotation of the crankshaft 18 and camshaft 16 causes rotation of one or more propulsors (e.g. propellers, impellers, and/or the like) for causing movement of a marine vessel. Such arrangements are known in the art and examples are disclosed in references incorporated herein by reference, including U.S. Pat. Nos. 7,806,741; 7,354,324; 7,299,783; 6,571,753; 6,295,963; 6,109,986; and 5,950,588.

The system 10 includes an Engine Control Unit (ECU) 20 for controlling operations of the engine 9. The ECU 20 is a programmable controller that includes a computer processor 22, software 24, memory (i.e. computer storage) 26 and an input/output (interface) device 28. The processor 22 loads and executes the software 24 from the memory 26. When executed, software 24 controls the engine 9 to operate according to the functionality described in further detail below. In some examples, the processor 22 can comprise a microprocessor and related circuitry that retrieves and executes software 24 from memory 26. Processor 22 can be implemented within a single device, or can alternately be distributed across multiple processing devices or sub-systems that cooperate in executing program instructions. Examples include general purpose central processing units, application specific processors, and logic devices, as well as any other type of processing device, combinations of processing devices, and/or variations thereof.

The system 10 includes a throttle device 38 that is configured to control an inflow of air into an intake manifold (e.g., intake manifold 151 of FIG. 1) for combustion in engine 9. For example, the throttle device 38 may comprise a throttle body having a through-bore for conveying air for combustion in the marine engine 9. A throttle plate may be disposed in the through-bore and movable into and between a closed position in which the throttle plate blocks and therefore prevents airflow into the through-bore and an open position in which the throttle plate opens and therefore allows the airflow through the through-bore. In known embodiments, the throttle plate may be pivotable between numerous positions (e.g., by a conventional actuator mechanism) between the open position and the closed position to thereby control an amount of air permitted to combust within the marine engine 9.

The system 10 also includes a crankshaft sensor 36 that is configured to sense rotation and position of the crankshaft 18 and then provide electronic signals to the ECU 20 that represent the speed of rotation of the crankshaft 18 and the rotational position of the crankshaft 18. The system may also include a camshaft sensor 37 that senses the rotational speed and position of the camshaft 16, which information also may be employed to determine the rotation cycle of the crankshaft 18. In certain examples, the crankshaft sensor 36 and the camshaft sensor 37 can be conventional encoders located on the crankshaft 18 and camshaft 16, respectively; however, any conventional sensor that is configurable to sense speed of rotation and communicate this information to the ECU 20 can be utilized. In one example, the crankshaft sensor 36 and the camshaft sensor 37 are rotary encoders that provide information about the angular position of the crankshaft 18 and the camshaft 16, respectively, which is then used to determine an engine speed and other operation parameters of the engine.

System 10 also includes fuel system 50. The fuel system 50 includes a fuel delivery assembly 51-54 for each piston-cylinder 1-4. As shown in the exemplary embodiment of FIG. 1, each fuel delivery assembly 51-54 may include a fuel injector 74 physically connected to each piston-cylinder 1-4. The ECU 20 controls the fuel injector 74 in order to deliver an amount of fuel 48 to that piston-cylinder. The fuel 48 is supplied to the fuel injector 74 from one or more fuel tanks (e.g., fuel tank 71) via fuel lines 77, 79.

The alcohol content of the fuel 48 stored in the fuel tank 71 may be determined by alcohol sensor 75. The type and mounting location of the alcohol sensor 75 is not particularly limited, and may include suitable type of sensor (e.g., a capacitive sensor) that is configured to measure an amount of alcohol (e.g., ethanol) in the fuel stored in the fuel tank 71. In some implementations, the alcohol sensor 75 may be positioned to measure the alcohol content of the fuel flowing from the fuel tank 71 through the fuel line 79. In still further implementations, an oxygen sensor, for example, a narrow band or wide band oxygen sensor mounted somewhere in the exhaust stream, may be utilized in place of or in addition to the alcohol sensor 75 to indirectly derive the alcohol content of the fuel via oxygen measurements. Since alcohol fuels are highly oxygenated and utilizing a fuel that deviates from the reference calibration will result in a mismatch between actual and desired Lambda values in the exhaust stream, the difference between measured Lambda values from the oxygen sensor and calibrated Lambda values can be utilized to calculate the alcohol content of fuel.

Figure 3:
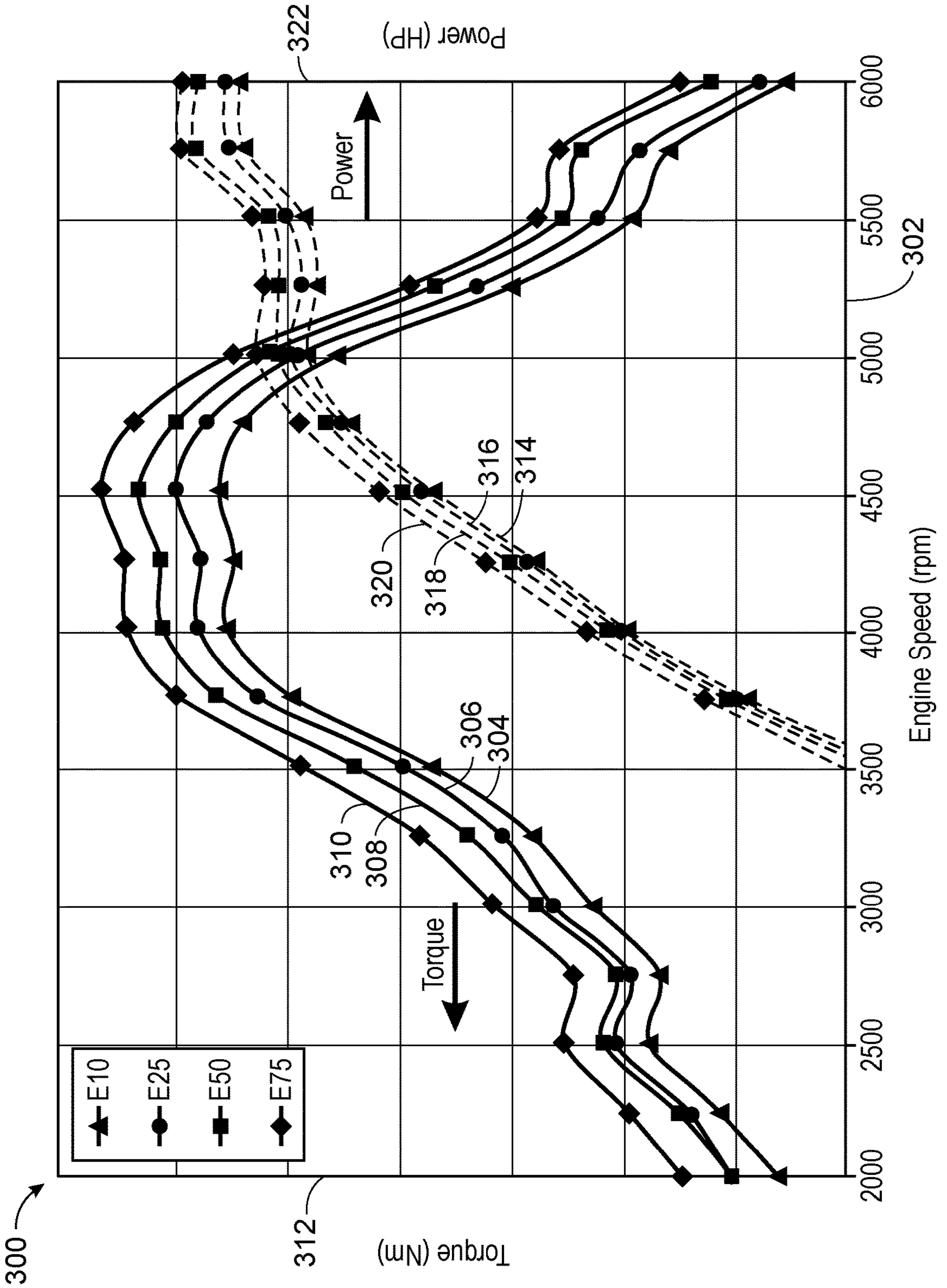
FIG. 3 is a plot comparing marine engine torque and horsepower performance achievable using various high and low blend marine fuels.

Referring now to FIG. 3, plot 300 illustrates comparable power and torque outputs for an engine (e.g., engine 9) fueled by fuels containing variable alcohol content. Horizontal axis 302 depicts speed of the engine 9 or the speed of a propeller driven by the engine 9 in revolutions per minute (RPM), while trendlines 304, 306, 308, and 310 associated with first vertical axis 312 are representative of the torque produced in Newton-meters (N·m) by combusting E10, E25, E50, and E75 fuels respectively. Trendlines 314, 316, 318, and 320 associated with second vertical axis 322 are representative of the power produced in horsepower (hp) by combusting E10, E25, E50, and E75 fuels respectively. In other exemplary implementations, power and torque outputs for a variety of methanol fuel blends could be stored and utilized for calibrations, similar to the variety of ethanol blend fuels depicted in FIG. 3. As shown, the relationship between power and alcohol content of the fuel is linear; therefore, as the alcohol content of the fuel increases, the power correspondingly increases. Furthermore, as described below with reference to FIG. 4, one or more of the trendlines 304-310 and 314-320 may be stored in the ECU 20 to calibrate engine parameters in order to leverage the extra power from higher blend fuels without causing a propeller pitch mismatch.

Figure 4:
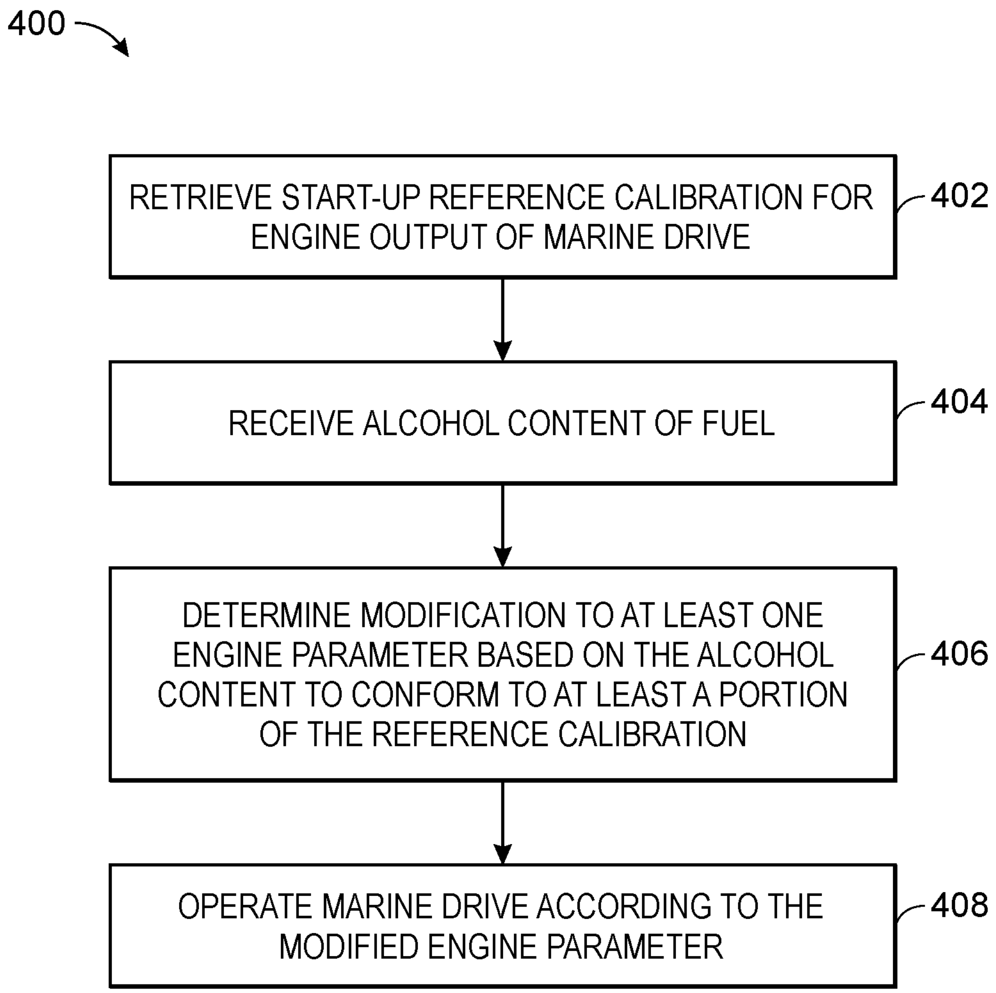
FIG. 4 is flow chart of an exemplary method for controlling a marine propulsion system according to the present disclosure.

FIG. 4 depicts a method 400 for operating the system 10 for use with fuels of varying alcohol content. In an exemplary implementation, method 400 is performed primarily by the ECU 20 in conjunction with various sensors, controllers, and devices within the system 10. Method 400 commences at step 402, as the ECU 20 retrieves a start-up reference calibration for the marine drive, for example, a reference calibration stored in memory 26. The reference calibration may be stored for any suitable fuel blend. In an exemplary embodiment, the reference calibration may be a calibration obtained by test data and/or calculation for expected engine torque and power performance utilizing E0 (i.e., fuel that does not contain alcohol) or E10 fuel over a range of engine or propeller speeds, as shown by trendlines 304 and 314 of FIG. 3.

Continuing with step 404, the ECU 20 receives the alcohol content of the fuel stored in fuel tank 71 and supplied by the fuel system 50. In an exemplary implementation, the alcohol content of the fuel stored in the fuel tank 71 is directly measured by the alcohol content sensor 75 and communicated to the ECU 20. In other implementations, the alcohol content of the fuel may be calculated indirectly, for example, based on oxygen measurements from an oxygen sensor.

At step 406, the ECU 20 determines a modification to at least one engine parameter based on the alcohol content received at step 404 in order to make the engine 9 conform to at least a portion of the reference calibration. In an exemplary implementation, the ECU 20 determines an amount of power that can be generated by the fuel in excess of the reference calibration and determines the modification to the at least one engine parameter based on the calculated excess power. The determination at step 406 may be based on an interpolation of the reference calibration. For example, returning to FIG. 3, if the alcohol content sensor 75 measures an alcohol content indicating that E75 is in use and the reference calibration is E10 fuel, when operating at a speed of 4800 RPM, the reference calibration for E10 fuel (see trendline 314) indicates a baseline power level, while E75 fuel (see trendline 320) generates approximately 2% more power.

In some implementations, modifying at least one engine parameter to make the engine 9 conform to at least a portion of the reference calibration may include decreasing the throttle position, for example, by moving a throttle plate toward the closed position so that a smaller volume of air is combusted within the engine 9. In other embodiments, modifying an engine parameter to make the engine 9 conform to at last a portion of the reference calibration may include increasing the throttle position, for example, by moving the throttle plate so that the throttle is more opened and a larger volume of air is combusted within the engine 9. Since the relationship between the power generated for a given amount of air and fuel is stored in the ECU 20, returning to the previous example, if the excess power is determined to be 5 hp, the ECU 20 can determine the associated reduction in air volume required to reduce the power generated by the engine 9 by 5 hp. In further implementations, the modified engine parameter may be retarding or advancing the timing of ignition (e.g., spark provided by spark plugs of ignitions 31-34), retarding or advancing the timing of the camshaft 16, increasing or decreasing the boost pressure (e.g., if the engine 9 includes a turbocharger), increasing or decreasing a volume of exhaust gas recirculation (EGR) or % EGR dilution (e.g., through use of an external EGR valve that controls a portion of exhaust gas flow through the intake manifold 151 to be directed back into the combustion chamber with fresh incoming air), and increasing or decreasing quantity and/or rate of fuel provided to the engine 9 in order to modify the AFR. Both increasing and decreasing the rate of fuel provided to the engine 9 may reduce the efficiency of combustion, thereby reducing the power generated by the engine. In other implementations, the ECU 20 may determine modifications to multiple engine parameters in order to make the engine 9 conform to at least a portion of the reference calibration.

Method 400 concludes at step 408, as the ECU 20 operates the engine 9 according to to the one or more modifications determined in step 406. In some implementations, the ECU 20 may operate the engine 9 according to the modification over all speeds that the engine 9 is operational, so that the torque and/or power generated by the engine 9 fully conforms with the reference calibration. In other implementations, the ECU 20 may operate the engine 9 according to the modifications only when a speed parameter of the marine drive (e.g., the engine speed, the propeller speed) exceeds a certain threshold speed. In this way, the performance of the engine 9 conforms to only a portion of the reference calibration (i.e., the torque and/or power curve) that exceeds the threshold speed. For example, the ECU 20 may permit the engine 9 to operate according to the performance benefits achievable through use of a high blend alcohol fuel (e.g., faster acceleration) only when the engine speed is less than 5,000 RPM, and may reduce the throttle position for engine speeds in excess of 5,000 RPM (i.e., the threshold speed) so that the generated power conforms with the reference calibration. In various implementations, the threshold speed may be based on the alcohol content of the fuel. For example, fuels having higher alcohol content may have higher speed thresholds than fuels having lower alcohol content. In still further implementations, the ECU 20 may modify a revolution limiter that imposes a maximum speed parameter (e.g., maximum engine speed, maximum propeller speed) on the engine 9 based on the content of the alcohol fuel. For example, if the revolution limiter normally limits the engine 9 to 6,200 RPM, if the ECU 20 determines that a higher alcohol content is used than the fuel utilized in the reference calibration, the ECU 20 may increase the revolution limiter to 6,400 RPM to leverage additional top speed performance achievable using the higher blend alcohol fuel. Returning to FIG. 5, the effects of leveraging available octane by advancing the ignition timing of the engine are depicted in datapoints 510 and 512 for E10 and E85 fuel, respectively. As shown, maximizing the ignition advance for E10 fuel (datapoint 510) permits the vessel to improve its 0-20 mph acceleration from approximately 6.4 seconds to 6.2 seconds and its top speed from just under 56.5 mph to just over 57.5 mph. Maximizing the ignition advance for E85 fuel (datapoint 512) permits the vessel to improve its 0-20 mph acceleration from approximately 5.7 seconds to 5.2 seconds and its top speed from just over 57.5 mph to approximately 59.2 mph.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A marine propulsion system for a marine vessel, comprising:
- at least one marine drive having an internal combustion engine configured to combust fuel;
- a sensor used to determine an alcohol content of the fuel supplied to the internal combustion engine;
- a memory storing a reference calibration for engine output; and one or more controllers configured to:
- receive the alcohol content of the fuel;
- determine that a measured speed parameter of the at least one marine drive exceeds a threshold speed;
- determine a modification to at least one engine parameter based on the alcohol content of the fuel so that the engine performs according to at least a portion of the reference calibration, wherein the engine parameter comprises at least one of a throttle position, a spark timing, an air-fuel ratio, a boost pressure, an exhaust gas recirculation and a camshaft timing; and
- operate the at least one marine drive according to the modified engine parameter for the portion of the reference calibration that exceeds the threshold speed.

2. The marine propulsion system of claim 1, wherein the threshold speed is based on the alcohol content of the fuel.

3. The marine propulsion system of claim 1, wherein the modification to the at least one engine parameter comprises increasing or decreasing the throttle position.

4. The marine propulsion system of claim 1, wherein the modification to the at least one engine parameter comprises retarding and/or advancing the spark timing.

5. The marine propulsion system of claim 1, wherein the modification to the at least one engine parameter comprises increasing or decreasing the boost pressure.

6. The marine propulsion system of claim 1, wherein the modification to the at least one engine parameter comprises reducing and/or increasing the exhaust gas recirculation.

7. The marine propulsion system of claim 1, wherein the modification to the at least one engine parameter comprises increasing and/or decreasing the air-fuel ratio.

8. The marine propulsion system of claim 1, wherein the one or more controllers are further configured to modify a maximum speed parameter of the at least one marine drive based on the alcohol content of the fuel.

9. The marine propulsion system of claim 8, wherein the maximum speed parameter is at least one of a maximum engine speed and a maximum propeller speed.

10. A method for operating a marine propulsion system having at least one marine drive having an internal combustion engine configured to combust fuel, comprising:
- receiving an alcohol content from a sensor configured to determine an alcohol content of the fuel supplied to the internal combustion engine;
- determining that a measured speed parameter of the at least one marine drive exceeds a threshold speed;
- determining a modification to at least one engine parameter based on the alcohol content of the fuel so that the engine performs according to a reference calibration for engine output, wherein the engine parameter comprises at least one of a throttle position, a spark timing, an air-fuel ratio, a boost pressure, an exhaust gas recirculation and a camshaft timing; and
- operating the at least one marine drive according to the modified engine parameter for the portion of the reference calibration that exceeds the threshold speed.

11. The method of claim 10, wherein the threshold speed is based on the alcohol content of the fuel.

12. The method of claim 10, wherein the modification to the at least one engine parameter comprises increasing or decreasing the throttle position.

13. The method of claim 10, wherein the modification to the at least one engine parameter comprises retarding and/or advancing the spark timing.

14. The method of claim 10, wherein the modification to the at least one engine parameter comprises increasing or decreasing the boost pressure.

15. The method of claim 10, wherein the modification to the at least one engine parameter comprises reducing and/or increasing the exhaust gas recirculation.

16. The method of claim 10, wherein the modification to the at least one engine parameter comprises increasing and/or decreasing the air-fuel ratio.

17. The method of claim 10, wherein the method further comprises modifying a maximum speed parameter of the at least one marine drive based on the alcohol content of the fuel.

18. The method of claim 17, wherein the maximum speed parameter is at least one of a maximum engine speed and a maximum propeller speed.

* * * * *